US005695025A

United States Patent [19]
White

[11] Patent Number: 5,695,025
[45] Date of Patent: Dec. 9, 1997

[54] STEERING AXLE BRAKE ASSEMBLY

[75] Inventor: Jay D. White, Galesburg, Mich.

[73] Assignee: Eaton Corporation, Cleveland, Ohio

[21] Appl. No.: 545,166

[22] Filed: Oct. 19, 1995

Related U.S. Application Data

[63] Continuation of Ser. No. 298,512, Aug. 30, 1994, abandoned.

[51] Int. Cl.$^6$ ............................................. F16D 51/00
[52] U.S. Cl. ............................................. 188/78; 188/250 D
[58] Field of Search .............................. 188/78, 250 A, 188/250 D, 325, 329, 330, 332, 341, 343

[56] References Cited

U.S. PATENT DOCUMENTS

| | | | |
|---|---|---|---|
| 3,301,355 | 1/1967 | Borgard | 188/78 |
| 3,343,633 | 9/1967 | Kennel | 188/78 |
| 3,398,814 | 8/1968 | Deibel | 188/78 |
| 3,572,478 | 3/1971 | Nagel | 188/330 |
| 4,476,968 | 10/1984 | Urban | 188/329 |
| 4,503,953 | 3/1985 | Majewski | 188/332 |
| 4,624,348 | 11/1986 | Williams | 188/332 |

FOREIGN PATENT DOCUMENTS

| | | | |
|---|---|---|---|
| 973248 | 9/1950 | France | 188/329 |
| 1021909 | 2/1953 | France | 188/78.34 |
| 2067693 | 7/1981 | United Kingdom | 188/329 |

*Primary Examiner*—Robert J. Oberleitner
*Assistant Examiner*—C. T. Bartz
*Attorney, Agent, or Firm*—Loren H. Uthoff, Jr.; Howard D. Gordon

[57] ABSTRACT

A vehicle brake assembly where the actuator tube is positioned in a relief portion formed in the periphery of a brake spider and a pair of separated return springs are respectively attached to a pair of brake shoes pivotably mounted to the spider where an actuator mounting flange is positioned against a shoulder formed in the actuator tube. The brake assembly overall size is minimized for use in a reduced diameter wheel while maximizing the travel of the brake shoes using a cam type actuator.

2 Claims, 2 Drawing Sheets

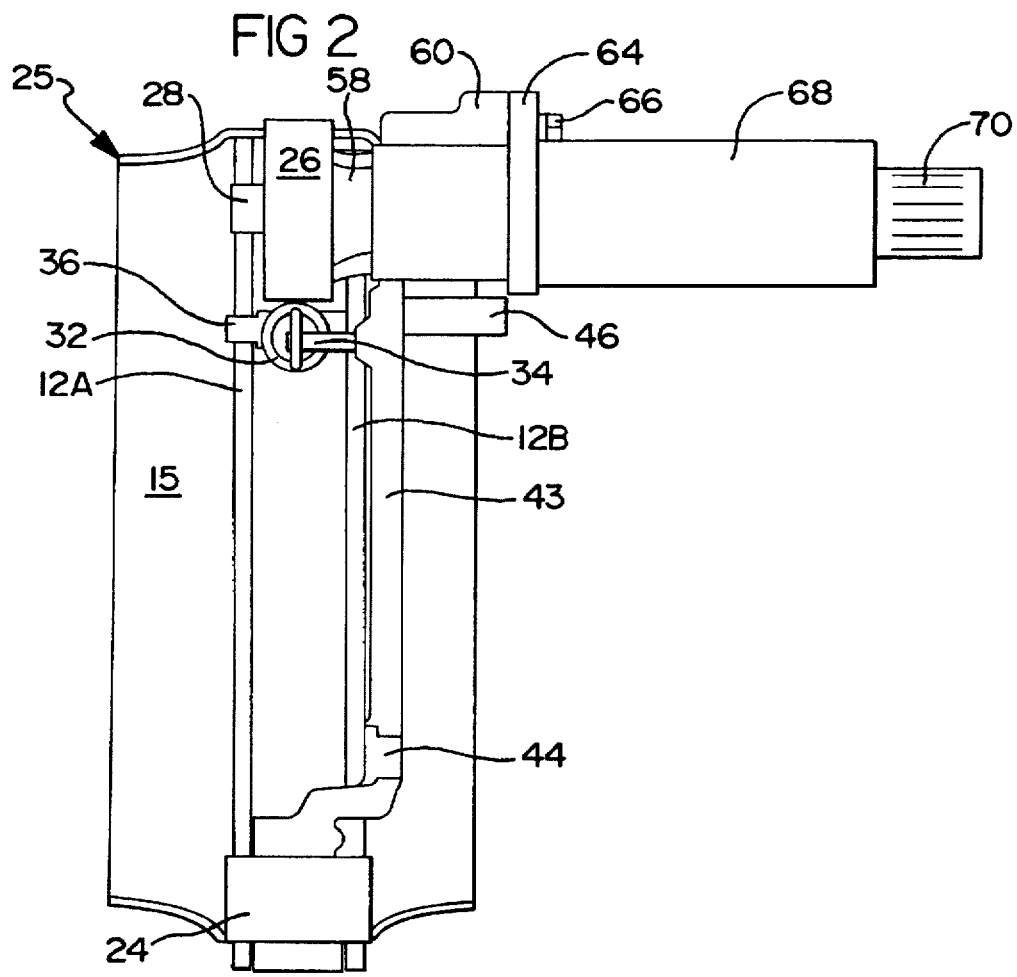
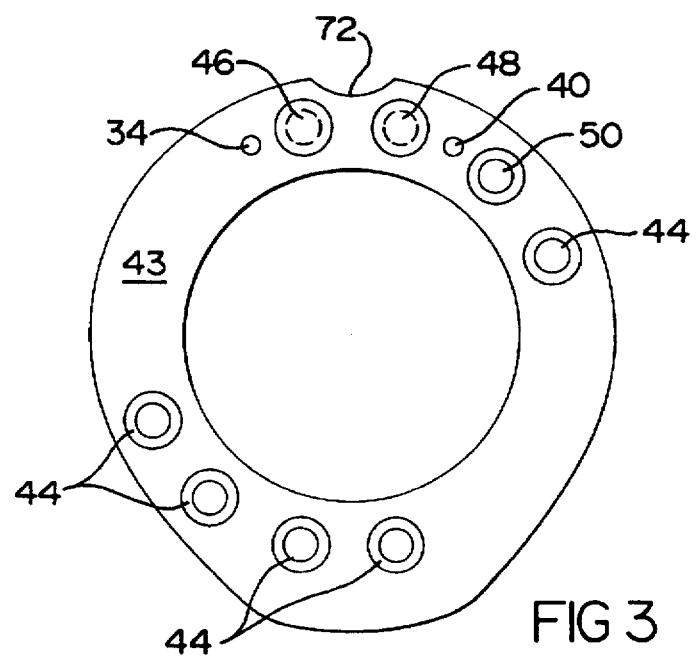

STEERING AXLE BRAKE ASSEMBLY

This application is a continuation of application Ser. No. 08/298,512 filed on Aug. 30, 1994 now abandoned.

BACKGROUND OF THE INVENTION

1. Field of the Invention

The present invention relates to a brake assembly for a steer axle on a heavy duty truck. More specifically, the present invention relates to a braking assembly for the steer axle on a heavy duty truck where the brake spider is relieved to provide clearance for the brake actuation tube and two brake return springs are used to provide clearance for an S-cam actuator.

2. Description of the Prior Art

It is well known in the prior art to use a "S-cam" to actuate a pair of arcuate brake shoes to contact the inner surface of a brake drum to provide a frictional braking force to a vehicle wheel assembly.

Although the present invention is not strictly limited to rotary cam brakes of the S-cam type, but could be used with various other configurations of rotary cam brakes, the invention is especially advantageous when used with S-cam brakes, and will be described in connection therewith. An example of a typical S-cam expanding internal shoe drum brake is disclosed in U.S. Pat. No. 4,905,800, assigned to the assignee of the present invention and incorporated herein by reference.

The use of smaller diameter wheels requires that the brake be designed to fit within the confines of a restricted space which in turn restricts the diameter of the brake shoes and the allowable travel of the S-cam due to internal clearance restrictions. As the S-cam is moved closer to the axle spindle, clearances become a concern since the return spring must clear the S-cam and the spindle. One solution is to reduce the size of the S-cam thereby reducing the amount of travel available which would also reduce the service life of the brake. Ideally, the S-cam travel is maximized to allow thicker brake pads to be used which extends the time between brake pad replacement.

Another problem to date has been the accurate placement of the mounting flange on the actuator tube for welding. Inaccuracy in placement of the mounting flange can result in improper function due to binding or excess wear.

SUMMARY OF THE INVENTION

The present invention allows for the maximum travel in an S-cam actuated drum brake while minimizing the overall package size for fitting within a smaller diameter wheel. The S-cam actuator tube is positioned in a clearance relief portion formed in the top edge of the brake spider. This position of the brake actuator tube allows the overall diameter of the brake assembly to be minimized. To maximize the available travel of the S-cam actuator, the brake return spring is separated into two springs, one on each side of the S-cam, so as to provide clearance for the end of the S-cam to traverse essentially the full distance between the end of the S-cam and the wheel spindle when the brake is actuated.

Accurate positioning of the mounting flange to the actuator tube has been a problem in the prior art. The present invention provides this function with the incorporation of a step portion formed in the actuator tube that can be used to position the mounting flange by defining the axial position and angle of the mounting flange on the actuator tube where it is then fastened with some technique such as welding.

One provision of the present invention is to provide a compact S-cam brake assembly.

Another provision of the present invention is to provide a compact S-cam brake assembly where the brake spider is notched for clearance of the actuation tube.

Another provision of the present invention is to provide a compact S-cam brake assembly where the return spring is bifurcated into two springs, one fitted on either side of the S-cam.

Still another provision of the present invention is to provide a positive positioning of the actuator mounting flange on the actuator tube by providing a step portion on the periphery of the tube.

BRIEF DESCRIPTION OF THE DRAWINGS

FIG. 2 is a cross-sectional view of the brake assembly of the present invention taken along line II—II of FIG. 1;

FIG. 3 is a frontal view of the brake spider of the present invention; and

DETAILED DESCRIPTION OF THE PREFERRED EMBODIMENT

Figures 1, 4:
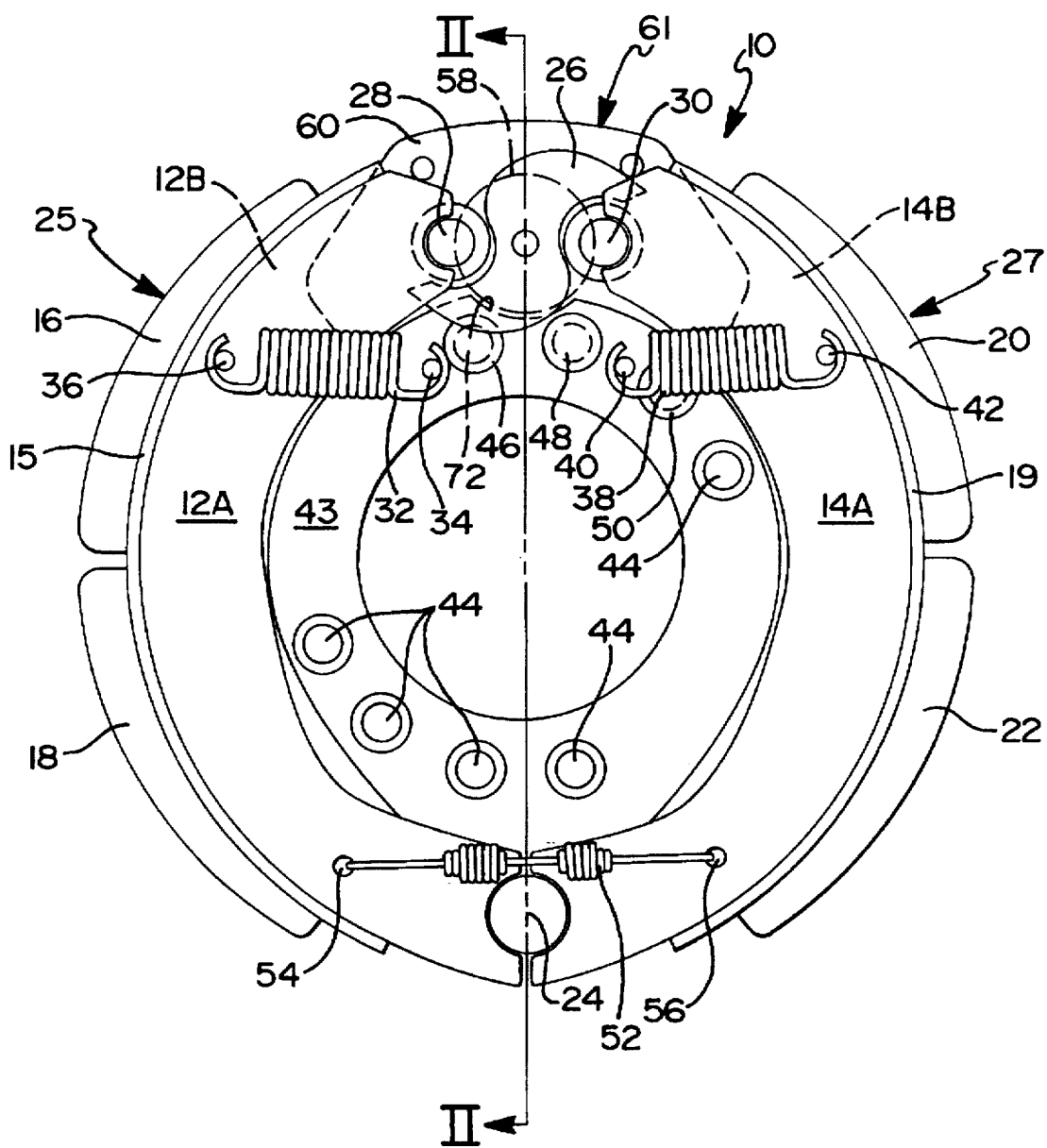
FIG. 1 is a cross-sectional frontal view of the brake assembly of the present invention.
FIG. 4 is a elevational view of the actuator tube of the brake assembly of the present invention.

In this disclosure, certain terminology will be used for convenience and reference only and will not be limiting. For example, the terms "forward" and "rearward" will refer to directions forward and rearward of the brake assembly as installed in a vehicle. The terms "rightward" and "leftward" will refer to directions in the drawings in connection with which the terminology is used. The terms "inwardly" and "outwardly" will refer to directions toward and away from, respectively, the geometrically center of the brake assembly of the present invention. The terms "upward" and "downward" will refer to directions as taken in the drawings in connection with which the terminology is used. All foregoing terms include the normal derivatives and equivalents thereof.

Now referring to FIG. 1 of the drawings, the brake assembly 10 of the present invention is shown in a cross-sectional view. The brake assembly 10 is comprised of an outer web 12A and an inner web 12B which lies directly inward from the outer web 12A. The outer web 12A and the inner web 12B support left brake table 15 which in turn serves to mount and support an upper brake shoe 16 and a lower brake shoe 18. In a similar manner, an outer web 14A combines with an inner web 14B to support right brake table 19 which in turn serves to mount and support an upper brake shoe 20 and a lower brake shoe 22. The function of the brake shoes 16, 18, 20 and 22 are to frictionally contact the inner surface of a brake drum (not shown) that function to slow the rotation of a vehicle wheel (also not shown).

The brake assembly 10 of the present invention allows the travel of the brake shoes 16, 18, 20, 22 to be maximized using an actuator, such as a pneumatic diaphragm (not shown), that rotates the S-cam 26 which contacts a roller follower 28 mounted to outer web 12A and inner web 12B. Rotation of the S-cam causes the left brake shoe assembly 25 and the left brake shoe assembly 27 to be expanded apart so as to cause the brake shoes 16, 18, 20 and 22 to contact the brake drum. Thus, the S-cam also contacts roller follower 30 which is supported by outer web 14A and inner web 14B so as to cause brake shoe assembly 25 and brake shoe assembly 27 to be expanded outwardly by rotation of the S-cam 26 acting on the roller follower 28 and roller follower 30. The left brake shoe assembly 25 and the right brake shoe assembly 27 pivot on lower pin 24 and separate upon rotation of the S-cam 26 to contact the brake drum (not shown). The left brake shoe assembly 25 and the right brake shoe assembly 27 are urged back into the contracted position as shown in FIG. 1 by return spring 32 and return spring 38 where each is attached to their respective brake shoe assemblies 25 and 27 and to brake spider 43 at spring pin 34 and spring pin 40, respectively. Return spring 32 is attached to the outer web 12A of the left brake shoe assembly 25 at spring pin 36 and at the spider 43 at spring pin 34. The return spring 38 is attached to the right outer web 14A at spring pin 42 and at the spider 43 at spring pin 40. The left brake shoe assembly 25 and the right brake shoe assembly 27 are held against the lower pin 24 by retention spring 52 which joins the respective brake web 12A and 14A at spring hole 54 and spring hole 56, respectively.

The brake spider 43 is mounted to the spindle hub (not shown) of the vehicle using fasteners placed in bolt holes 44 which surround the mounting fasteners joining the hub and the brake spider 43. Also used to mount the brake spider 43 are the mounting studs 46, 48 and 50 which engage mating holes formed in the steer axle spindle hub.

The S-cam 26 is rotated by action of some type of pneumatic or hydraulic linear actuator as previously disclosed which operates on an attachment arm joined to the actuator rod 58 at rod spline 70 shown in FIG. 2, which rotates the S-cam 26 causing the left brake shoe assembly 25 and the right brake shoe assembly 27 to be separated and expanded to frictionally contact the brake drum. The actuator mount 60 is used to secure the actuator assembly 61 to the spider 43.

The return springs 32 and 38 are traditionally formed into one spring that connects from the left spring pin 36 continuously to the right spring pin 42. However, if the overall diameter of the brake assembly 10 is to be minimized, while retaining the full travel capabilities of the S-cam 26, the S-cam 26 would interfere with the traditional return spring and thus, for clearance purposes, the return spring is divided into the left return spring 32 and the right return spring 38.

To further compact the brake assembly 10, the center line of the S-cam 26 is lowered to a point such that the S-cam 26 barely clears the vehicle hub and spindle assembly. Thus, to allow for the actuator assembly 61 to be lowered towards the center line of the brake assembly 10 of the present invention to minimize the overall diameter of the brake assembly 10, the brake spider 43 must be relieved in a semi-circular fashion between the mounting studs 46 and 48 in the area labeled as spider relief 72. The spider relief 72 provides for a very compact arrangement of the actuator assembly 61 working in conjunction with the split return springs 32 and 34 to provide for clearance of the S-cam 26 upon actuation of the brake assembly 10.

Now referring to FIG. 2 of the drawings, a cross-sectional view taken along line II—II of the brake assembly 10 of the present invention as shown in FIG. 1 is used to further illustrate the design of the brake assembly 10 which has a minimized overall diameter and maximized long travel S-cam 26. The brake spider 43 is used, as previously discussed, to mount the spring pin 34 upon which the return spring 32 is attached. Also shown is the spring pin 36 which extends between the left outer web 12A and the left inner web 12B upon which the return spring 32 is retained thereby functioning to force the left brake shoe assembly 25 towards the center of the brake assembly 10.

Shown in more detail is the actuator mount 60 which is formed as part of the brake spider 43, and serves to support the actuator flange 64 using retaining bolts 66. The actuator rod 58 extends leftwardly to attach to the S-cam 26 and rightwardly to extend through the actuator tube 68 and to form the rod spline 70 to which the actuator (not shown) is nonrotatably attached for actuation thereof. Also shown is the mounting stud 46 which extends through the brake spider 43 and into the steer axle hub spindle of the vehicle.

FIG. 3 is a front elevational view of the brake spider 43 as shown in FIG. 1. The brake spider 43 incorporates the spider relief 72 which allows the actuator tube 68 to be moved closer to the spindle (not shown) so as to minimize the overall diameter of the brake assembly 10. The mounting studs 46, 48 and 50 are shown and extend and bolt to the spindle hub of the vehicle as described previously. Also shown are the bolt holes 44 which allow for fastening devices, such as bolt studs, to extend therethrough and be piloted thereby for attachment of the brake spider 43 to the vehicle spindle hub. Also shown are spring pins 34 and 40.

In FIG. 4, an elevational view of the actuator tube 68 is shown where the actuator support flange 64 is positioned against a shoulder 78 on the actuator tube 68. A weld 76 is used to retain the actuator support flange 64 to the actuator tube 68. In this manner, the support flange 64 is accurately and conveniently located on the actuator tube 68.

Although this invention has been described in its preferred form with a certain degree of particularity, it is understood that the present disclosure of the preferred embodiment has been made only by way of example, and that numerous changes in the detailed construction and combination and arrangement of the parts may be resorted to without departing from the spirit and the scope of the invention, as hereinafter claimed.

I claim:

1. A vehicle brake assembly of the type comprising a pair of arcuate pivotally mounted brake shoes located interiorly of a brake drum, each of said brake shoes carrying a cam follower urged into direct engagement with an S-cam rotated by an actuator shaft supported in an actuator tube, where rotation of said S-cam in a first direction of rotation from a fully disengaged condition forces at least one of said brake shoes radially outward relative to said brake drum, said brake assembly further comprising:

a brake spider attached to a spindle hub, said spider having a relief portion formed in a peripheral edge allowing said actuator tube to be positioned therein, said brake spider supporting said brake shoes and said actuator tube;

said actuator tube comprising a first section, said first section having a first outer diameter and a second section, said second section having a second outer diameter larger than said first outer diameter and joined to said first section and coaxial therewith, thereby forming a shoulder;

a pair of return springs, each of said return springs having a first end attached to said brake spider and a second end attached to a respective braise shoe; and a flange disposed perpendicular to said first and said second section and adapted to be positioned by said shoulder, said flange being attached to said second section at said shoulder and attached to an actuator mount formed in said brake spider.

2. The vehicle brake assembly of claim 1, wherein one of said return springs is disposed on one side of said S-cam and a second of said return springs is disposed on a second side of said S-cam.

* * * * *